(12) United States Patent
Oishi (10) Patent No.: US 12,261,294 B2
(45) Date of Patent: Mar. 25, 2025

(54) LITHIUM SECONDARY BATTERY

(71) Applicant: NGK INSULATORS, LTD., Nagoya (JP)

(72) Inventor: Kengo Oishi, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 777 days.

(21) Appl. No.: 17/304,388

(22) Filed: Jun. 21, 2021

(65) Prior Publication Data

US 2021/0320297 A1 Oct. 14, 2021

Related U.S. Application Data

(63) Continuation of application No. PCT/JP2020/010127, filed on Mar. 9, 2020.

(30) Foreign Application Priority Data

Apr. 25, 2019 (JP) ................. 2019-084699

(51) Int. Cl.
*H01M 4/525* (2010.01)
*H01M 4/02* (2006.01)
(Continued)

(52) U.S. Cl.
CPC ....... *H01M 4/525* (2013.01); *H01M 10/0525* (2013.01); *H01M 50/434* (2021.01);
(Continued)

(58) Field of Classification Search
CPC ............... H01M 4/525; H01M 50/434; H01M 2004/027; H01M 2004/028
See application file for complete search history.

(56) References Cited

U.S. PATENT DOCUMENTS 9,379,375 B2 6/2016 Sugiura et al.
9,531,036 B2 12/2016 Ohta et al.
(Continued)

FOREIGN PATENT DOCUMENTS

JP 2009-129790 A1 6/2009
JP 2013-232284 A1 11/2013
(Continued)

OTHER PUBLICATIONS

"Properties of Glass materials", Hasanuzzaman, Reference Module in Materials Science and Materials Engineering, 2016 (Year: 2016).*
(Continued)

*Primary Examiner* — Aiqun Li
(74) *Attorney, Agent, or Firm* — BURR PATENT LAW, PLLC (57) ABSTRACT

Provided is a lithium secondary battery including a positive electrode layer composed of a cobalt-containing lithium composite oxide sintered body, a negative electrode layer composed of a titanium-containing sintered body, a ceramic separator interposed between the positive electrode layer and the negative electrode layer, an electrolyte impregnating at least the ceramic separator, and an exterior body having a closed space and accommodating the positive electrode layer, the negative electrode layer, the ceramic separator, and the electrolyte within the closed space. The positive electrode layer, the ceramic separator, and the negative electrode layer are bonded together. The lithium composite oxide sintered body contains, as an auxiliary agent, 0.05 to 2.0 mol % of boron with respect to the content of cobalt in the lithium composite oxide sintered body or 0.05 to 1.2 mol % of strontium with respect to the aforementioned cobalt content.

15 Claims, 4 Drawing Sheets

(51) Int. Cl.
*H01M 10/0525* (2010.01)
*H01M 50/434* (2021.01)
*H01M 50/443* (2021.01)
*H01M 50/489* (2021.01)
*H01M 50/491* (2021.01)

(52) U.S. Cl.
CPC ....... *H01M 50/443* (2021.01); *H01M 50/489* (2021.01); *H01M 50/491* (2021.01); *H01M 2004/021* (2013.01); *H01M 2004/027* (2013.01); *H01M 2004/028* (2013.01)

(56) References Cited

U.S. PATENT DOCUMENTS

| | | | |
|---|---|---|---|
| 10,454,109 | B2 | 10/2019 | Ohira et al. |
| 2007/0281206 | A1* | 12/2007 | Fujikawa ............ H01M 50/489 |
| | | | 429/62 |
| 2011/0003212 | A1 | 1/2011 | Sato et al. |
| 2012/0231327 | A1 | 9/2012 | Hiratsuka |
| 2012/0256337 | A1* | 10/2012 | Yokoyama ............ C01G 53/40 |
| | | | 241/3 |
| 2013/0157137 | A1* | 6/2013 | Fukushima ......... H01M 10/052 |
| | | | 429/231.1 |
| 2014/0060723 | A1* | 3/2014 | Herle .................. H01M 10/052 |
| | | | 156/89.12 |
| 2015/0111110 | A1 | 4/2015 | Watanabe et al. |
| 2017/0373300 | A1* | 12/2017 | Maeda ............. H01M 10/0436 |
| 2018/0026300 | A1* | 1/2018 | Shimizu ............ H01M 10/0562 |
| | | | 429/304 |
| 2021/0066745 | A1 | 3/2021 | Yura et al. |

FOREIGN PATENT DOCUMENTS

| | | |
|---|---|---|
| JP | 2014-049301 A1 | 3/2014 |
| JP | 5587052 B2 | 9/2014 |
| JP | 2015-041573 A1 | 3/2015 |
| JP | 2015-185337 A1 | 10/2015 |
| WO | 2011/111377 A1 | 9/2011 |
| WO | 2017/146088 A1 | 8/2017 |
| WO | 2018/123479 A1 | 7/2018 |
| WO | 2019/221146 A1 | 11/2019 |

OTHER PUBLICATIONS

English translation of the Written Opinion (Application No. PCT/JP2020/010127) dated Jun. 9, 2020.
International Search Report and Written Opinion (Application No. PCT/JP2020/010127) dated Jun. 9, 2020.

* cited by examiner

LITHIUM SECONDARY BATTERY

CROSS-REFERENCE TO RELATED APPLICATIONS

This application is a continuation application of PCT/JP2020/010127 filed Mar. 9, 2020, which claims priority to Japanese Patent Application No. 2019-084699 filed Apr. 25, 2019, the entire contents all of which are incorporated herein by reference.

BACKGROUND OF THE INVENTION

1. Field of the Invention

The present invention relates to a lithium secondary battery.

2. Description of the Related Art

Lithium secondary batteries are widely used in various devices that require charging. In many existing lithium secondary batteries, a powder-dispersed positive electrode (so-called coated electrode) produced by applying a positive electrode mixture containing a positive electrode active material, a conductive agent, a binder, and the like, followed by drying, is employed.

Such powder-dispersed positive electrodes generally contain a relatively large amount (e.g., about 10% by weight) of components (binders and conductive agents) that do not contribute to the capacity of battery, resulting in a low packing density of the positive electrode active material, i.e., lithium complex oxide. Accordingly, the powder-dispersed positive electrode should be greatly improved from the viewpoint of the capacity and charge/discharge efficiency. Some attempts have been made to improve the capacity and charge/discharge efficiency by positive electrodes or layers of positive electrode active material composed of lithium complex oxide sintered plate. In this case, since the positive electrode or the layer of positive electrode active material contains no binder or conductive agent, high capacity and satisfactory charge/discharge efficiency can be expected due to a high packing density of lithium complex oxide. For example, Patent Literature 1 (JP5587052B) discloses a positive electrode including a positive electrode current collector and a positive electrode active material layer connected to the positive electrode current collector with a conductive bonding layer therebetween. The positive electrode active material layer is composed of a lithium complex oxide sintered plate, and the sintered plate has a thickness of 30 μm or more, a porosity of 3 to 30%, and an open pore rate of 70% or more. Further, Patent Literature 2 (WO2017/146088) discloses use of an oriented sintered plate including a plurality of primary grains composed of lithium complex oxide such as lithium cobaltate ($LiCoO_2$), the plurality of primary grains being oriented at an average orientation angle of over 0° and 30° or less to the plate face in the positive electrode plate, as a positive electrode of a lithium secondary battery including a solid electrolyte.

Meanwhile, use of a titanium-containing sintered plate as a negative electrode has been also proposed. For example, Patent Literature 3 (JP2015-185337A) discloses a lithium secondary battery using a lithium titanate ($Li_4Ti_5O_{12}$) sintered body as a positive electrode or a negative electrode. However, this lithium secondary battery is an all-solid battery having a solid electrolyte layer between a positive electrode and a negative electrode and is not a secondary battery using a non-aqueous electrolytic solution.

CITATION LIST

Patent Literature

Patent Literature 1: JP5587052B
Patent Literature 2: WO2017/146088
Patent Literature 3: JP2015-185337A

SUMMARY OF THE INVENTION

In recent years, a small and thin lithium secondary battery with high capacity and high output has been desired. Therefore, it is conceivable to use a lithium complex oxide sintered plate as a positive electrode, expecting high capacity and good charge/discharge efficiency. From the same reason, it is also conceivable to use a titanium-containing sintered plate as a negative electrode. However, when a lithium secondary battery is actually produced using these sintered plates, that is, a ceramic positive electrode plate and a ceramic negative electrode plate, the capacity as expected could not be obtained. In this point, according to the findings of the inventors, a lithium secondary battery with high discharge capacity and excellent charge/discharge cycle performance can be provided by employing a configuration in which a positive electrode layer, a ceramic separator, and a negative electrode layer form one integrated sintered plate as a whole. However, since three layers of the positive electrode layer, the ceramic separator, and the negative electrode layer that have different compositions and different thermal expansion characteristics are bonded together in such a battery of the integrated sintered plate type, the integrated sintered plate tends to warp due to the firing temperature or the like. Further, significant warpage can reduce the yield of the battery. Therefore, it is desired to reduce warpage in the integrated sintered plate without impairing the excellent battery performance of the battery of the integrated sintered plate type.

The inventors have now found that, in a lithium secondary battery of the integrated sintered plate type in which a positive electrode layer, a separator, and a negative electrode layer are bonded together, the warpage in the integrated sintered plate can be reduced by the lithium composite oxide sintered body that constitutes the positive electrode layer containing boron or strontium at a predetermined content ratio, while the excellent battery performance (especially, discharge capacity) of the battery of the integrated sintered plate type is maintained.

Accordingly, it is an object of the present invention to provide a lithium secondary battery of the integrated sintered plate type in which a positive electrode layer, a ceramic separator, and a negative electrode layer are bonded together and which can achieve both excellent battery performance (especially, discharge capacity) and the reduction of warpage in the integrated sintered plate.

According to an aspect of the present invention, there is provided a lithium secondary battery comprising:
 a positive electrode layer composed of a cobalt-containing lithium composite oxide sintered body;
 a negative electrode layer composed of a titanium-containing sintered body;
 a ceramic separator interposed between the positive electrode layer and the negative electrode layer;
 an electrolyte impregnating at least the ceramic separator; and an exterior body having a closed space and accommodating the positive electrode layer, the negative electrode layer, the ceramic separator, and the electrolyte within the closed space, wherein the positive electrode layer, the ceramic separator, and the negative electrode layer are bonded together, and wherein the lithium composite oxide sintered body comprises 0.05 to 2.0 mol % of boron with respect to the content of cobalt in the lithium composite oxide sintered body or 0.05 to 1.2 mol % of strontium with respect to the content of cobalt in the lithium composite oxide sintered body, as an auxiliary agent.

DETAILED DESCRIPTION OF THE INVENTION

Lithium Secondary Battery

Figure 1:
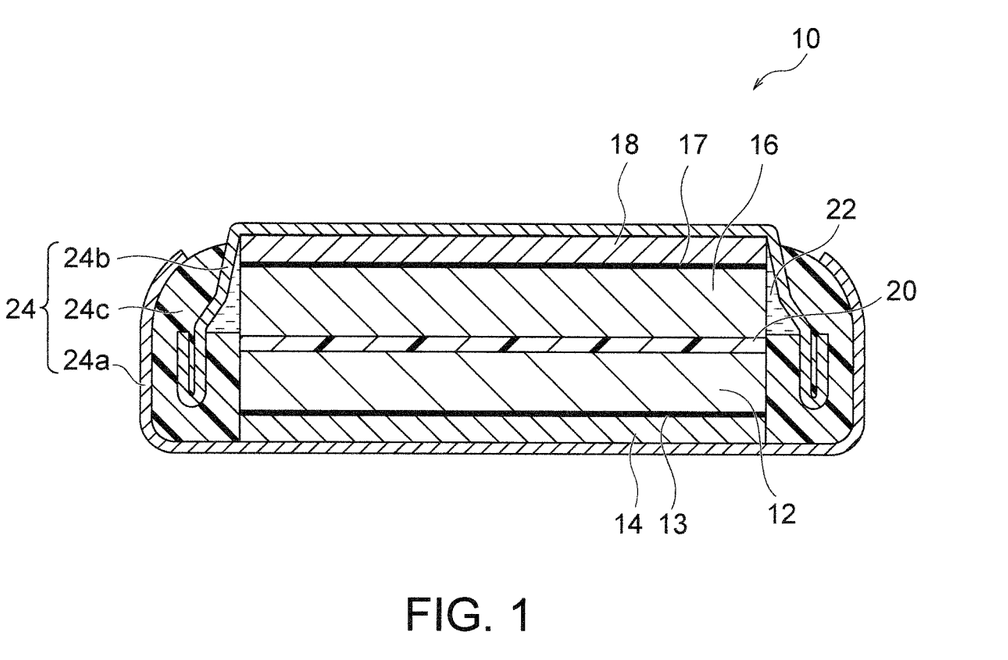
FIG. 1 is a schematic sectional view of an example of the lithium secondary battery of the present invention.

FIG. 1 schematically shows an example of the lithium secondary battery of the present invention. A lithium secondary battery 10 shown in FIG. 1 is in a form of coin-shaped battery, but the present invention is not limited to this and may be a battery in another form such as a thin secondary battery that can be incorporated in a card. The lithium secondary battery 10 includes a positive electrode layer 12, a negative electrode layer 16, a ceramic separator 20, an electrolytic solution 22, and an exterior body 24. The positive electrode layer 12 is composed of a cobalt-containing lithium composite oxide sintered body. The negative electrode layer 16 is composed of a titanium-containing sintered body. The ceramic separator 20 is interposed between the positive electrode layer 12 and the negative electrode layer 16. The positive electrode layer 12, the negative electrode layer 16, and the ceramic separator 20 are impregnated with the electrolytic solution 22. The exterior body 24 includes a closed space, and the closed space accommodates the positive electrode layer 12, the negative electrode layer 16, the ceramic separator 20, and the electrolytic solution 22. Further, the positive electrode layer 12, the ceramic separator 20, and the negative electrode layer 16 form one integrated sintered plate as a whole, whereby the positive electrode layer 12, the ceramic separator 20, and the negative electrode layer 16 are bonded together. Further, the lithium composite oxide sintered body that constitutes the positive electrode layer 12 contains, as an auxiliary agent, 0.05 to 2.0 mol % of boron with respect to the content of cobalt in the lithium composite oxide sintered body or 0.05 to 1.2 mol % of strontium with respect to the content of cobalt in the lithium composite oxide sintered body. In such a lithium secondary battery of the integrated sintered plate type in which the positive electrode layer 12, the ceramic separator 20, and the negative electrode layer 16 are bonded together, the warpage in the integrated sintered plate can be reduced by the lithium composite oxide sintered body that constitutes the positive electrode layer 12 containing boron or strontium at a predetermined content ratio, while the excellent battery performance (especially, discharge capacity) of the battery of the integrated sintered plate type is maintained. Further, the battery yield can be improved by reducing the warpage in the integrated sintered plate.

That is, it is conceivable to use a lithium complex oxide sintered plate as a positive electrode, expecting high capacity and good charge/discharge efficiency, as described above. From the same reason, it is also conceivable to use a titanium-containing sintered plate as a negative electrode. However, when a lithium secondary battery is actually produced using these sintered plates, that is, a ceramic positive electrode plate and a ceramic negative electrode plate, the capacity as expected could not be obtained. One of the causes is probably that the positions of the ceramic positive electrode plate and the ceramic negative electrode plate are displaced from each other in the battery assembly process. It is also conceivable to accurately fix the separator to the positive electrode plate and the negative electrode plate so that such a displacement does not occur. However, such a process requires a high level of technology that requires extremely accurate positioning, which therefore causes a reduction in production efficiency and an increase in cost. In addition, the sintered plate that constitutes each electrode plate may be wavy or warped. The presence of such waviness or warpage causes variations in the distance between the positive and negative electrodes, and such variations lead to a reduction in charge/discharge cycle performance.

In contrast, in the lithium secondary battery of the present invention, the positive electrode layer 12, the ceramic separator 20, and the negative electrode layer 16 form one integrated sintered plate as a whole, whereby the positive electrode layer 12, the ceramic separator 20, and the negative electrode layer 16 are bonded together. That is, the three layers of the positive electrode layer 12, the ceramic separator 20, and the negative electrode layer 16 are bonded together without resorting to other bonding methods such as adhesives. Here, to "form one integrated sintered plate as a whole" means that green sheets having a three-layer structure composed of a positive electrode green sheet providing the positive electrode layer 12, a separator green sheet providing the ceramic separator 20, and a negative electrode green sheet providing the negative electrode layer 16 are fired, so that each layer is sintered. Therefore, if the green sheets with a three-layer structure before firing are punched into a predetermined shape (such as a coin shape and a chip shape) using a punching die, the displacement between the positive electrode layer 12 and the negative electrode layer 16 in the integrated sintered plate in the final form is supposed not to exist at all. That is, the end face of the positive electrode layer 12 and the end face of the negative electrode layer 16 are aligned, so that the capacity can be maximized. Alternatively, even if such a displacement is present, the integrated sintered plate is suitable for processing such as laser processing, cutting, and polishing. Therefore, the end face may be finished to minimize or eliminate such a displacement. In any case, the positive electrode layer 12, the ceramic separator 20, and the negative electrode layer 16 are bonded together, as long as they form an integrated sintered plate, the displacement between the positive electrode layer 12 and the negative electrode layer 16 never occurs afterwards. The high discharge capacity, as expected (that is, close to the theoretical capacity), can be achieved by minimizing or eliminating the displacement between the positive electrode layer 12 and the negative electrode layer 16. Further, it is considered that, since the integrated sintered plate has a three-layer structure including the ceramic separator, waviness or warpage is less likely to occur (that is, the flatness is excellent), and therefore variations in the distance between the positive and negative electrodes are less likely to occur (that is, the distance is uniform), as compared with a single positive electrode plate and a single negative electrode plate that are each produced as one sintered plate, thereby contributing to improving the charge/discharge cycle performance. For example, the area displacement ratio between the positive electrode layer 12 and the negative electrode layer 16 is preferably less than 1%, more preferably less than 0.5%, further preferably 0%. The area displacement ratio between the positive electrode layer 12 and the negative electrode layer 16 is defined as a value (%) calculated based on the formula: $[(S_p+S_n)/S_{pn}] \times 100$, wherein the area of the region where the positive electrode layer 12 and the negative electrode layer 16 overlap each other is referred to as $S_{pn}$, the area of the region where the positive electrode layer 12 protrudes from the negative electrode layer 16 is referred to as $S_p$, and the area of the region where the negative electrode layer 16 protrudes from the positive electrode layer 12 is referred to as $S_n$. Further, the lithium secondary battery 10 preferably has a ratio of the discharge capacity to the theoretical capacity of 99% or more, more preferably 99.5% or more, further preferably 100%.

Thus, although the battery of the integrated sintered plate type gives significant advantages, three layers of the positive electrode layer 12, the ceramic separator 20, and the negative electrode layer 16 with different compositions and different thermal expansion characteristics are bonded together in the battery of this type, and therefore the integrated sintered plate tends to warp due to the firing temperature or the like, as described above. Significant warpage can reduce the yield of the battery. This problem is conveniently solved by the lithium composite oxide sintered body that constitutes the positive electrode layer 12 containing, as an auxiliary agent, 0.05 to 2.0 mol % of boron or 0.05 to 1.2 mol % of strontium, with respect to the content of cobalt in the lithium composite oxide sintered body. Although the detailed mechanism is not clear, it is considered that warpage is reduced by the lithium composite oxide sintered body that constitutes the positive electrode layer 12 containing the aforementioned predetermined amount of boron or strontium, because the thermal expansion characteristics of the positive electrode layer 12 approach the thermal expansion characteristics of the negative electrode layer 16. Further, the amounts of boron and strontium to be added are extremely slight with respect to the content of cobalt, as described above, and therefore the capacity reduction can be minimized. Thus, both the battery performance (especially, discharge capacity) and the reduction of warpage in the integrated sintered plate are considered to be achieved. Further, the battery yield is also improved by the reduction of warpage.

With the spread of IoT devices in recent years, a small and thin coin-shaped lithium secondary battery with high capacity and high output which can be charged particularly at a constant voltage (CV) has been desired. In this point, the lithium secondary battery 10 according to another preferable aspect of the present invention can sufficiently satisfy such requirements. In particular, employment of such respective predetermined sintered plates as a positive electrode and as a negative electrode enables not only heat resistance but also high capacity and high output, particularly, constant-voltage charging and high-speed charging to be achieved. Accordingly, the lithium secondary battery 10 of the present invention is preferably used as a battery for IoT devices. That is, another preferable aspect of the present invention provides an IoT device including a coin-shaped lithium secondary battery. Further, the lithium secondary battery 10 of the present invention is suitably used for applications such as smart keys, RFID tags, wearable devices, multifunction solar watches, memory backup power sources, automotive distributed power supplies, and the like, other than IoT devices. In this description, the term "IoT" is an abbreviation for Internet of Things, and the "IoT device" means any device connected to the Internet to exhibit specific functions. However, the lithium secondary battery of the present invention is not limited to such a coin-shaped battery and may be a battery in another form, as described above. For example, the lithium secondary battery may be a thin secondary battery that can be incorporated in a card.

The positive electrode layer 12 is composed of a cobalt-containing lithium composite oxide sintered body. The fact that the positive electrode layer 12 is composed of a sintered body means that the positive electrode layer 12 contains no binder or conductive agent. This is because, even if a binder is contained in a green sheet, the binder disappears or burns out during firing. Since the positive electrode layer 12 contains no binder, there is an advantage that deterioration of the positive electrode due to the electrolytic solution 22 can be avoided. The cobalt-containing lithium composite oxide constituting the sintered body is particularly preferably lithium cobaltate (typically, $LiCoO_2$ (which will be hereinafter abbreviated as LCO)). Various cobalt-containing lithium composite oxide sintered plates or LCO sintered plates are known, and those disclosed in Patent Literature 1 (JP5587052A) and Patent Literature 2 (WO2017/146088) can be referred to, for example.

The cobalt-containing lithium composite oxide sintered body that constitutes the positive electrode layer 12 contains boron or strontium as an auxiliary agent. In the case where the lithium composite oxide sintered body contains boron, the content of boron is 0.05 to 2.0 mol %, preferably 0.1 to 2.0 mol %, more preferably 0.2 to 1.8 mol %, further preferably 0.3 to 1.5 mol %, particularly preferably 0.4 to 1.0 mol %, with respect to the content of cobalt in the lithium composite oxide sintered body (which is taken as 100 mol %). In the case where the lithium composite oxide sintered body contains strontium, the content of strontium is 0.05 to 1.2 mol %, preferably 0.1 to 1.2 mol %, more preferably 0.2 to 1.0 mol %, further preferably 0.3 to 0.8 mol %, particularly preferably 0.4 to 0.7 mol %, with respect to the content of cobalt in the lithium composite oxide sintered body (which is taken as 100 mol %). Both of boron and strontium may be contained. When boron and/or strontium is contained within such a range, the reduction in battery capacity due to excessive addition of these elements can be avoided, while the reduction of warpage is effectively achieved by addition of boron or strontium. That is, the battery performance (especially, discharge capacity) and suppression of warpage in the integrated sintered plate can be more effectively achieved.

Figure 2:
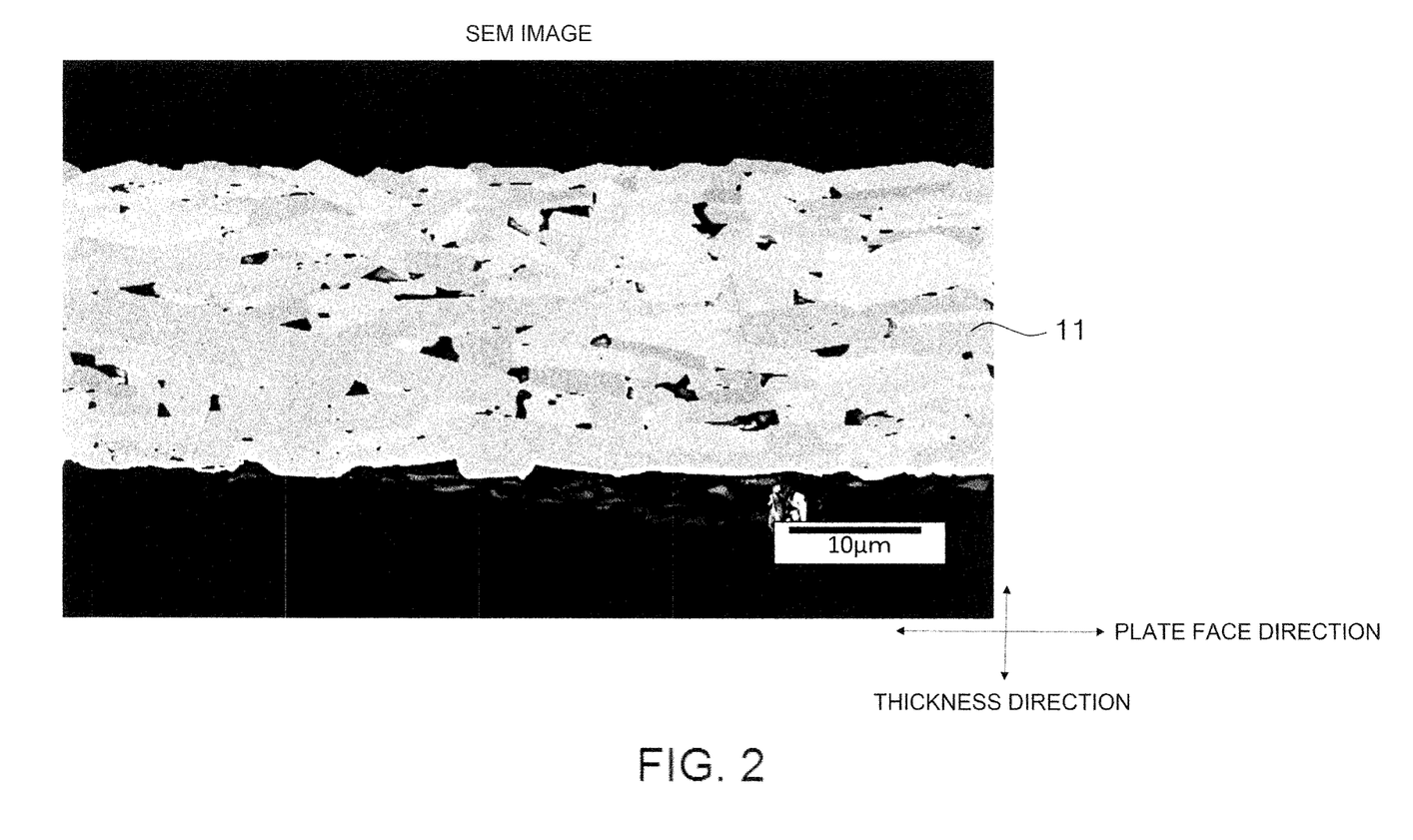
FIG. 2 is a SEM image showing an example of a cross section perpendicular to the layer face of an oriented positive electrode layer.
Figure 3:
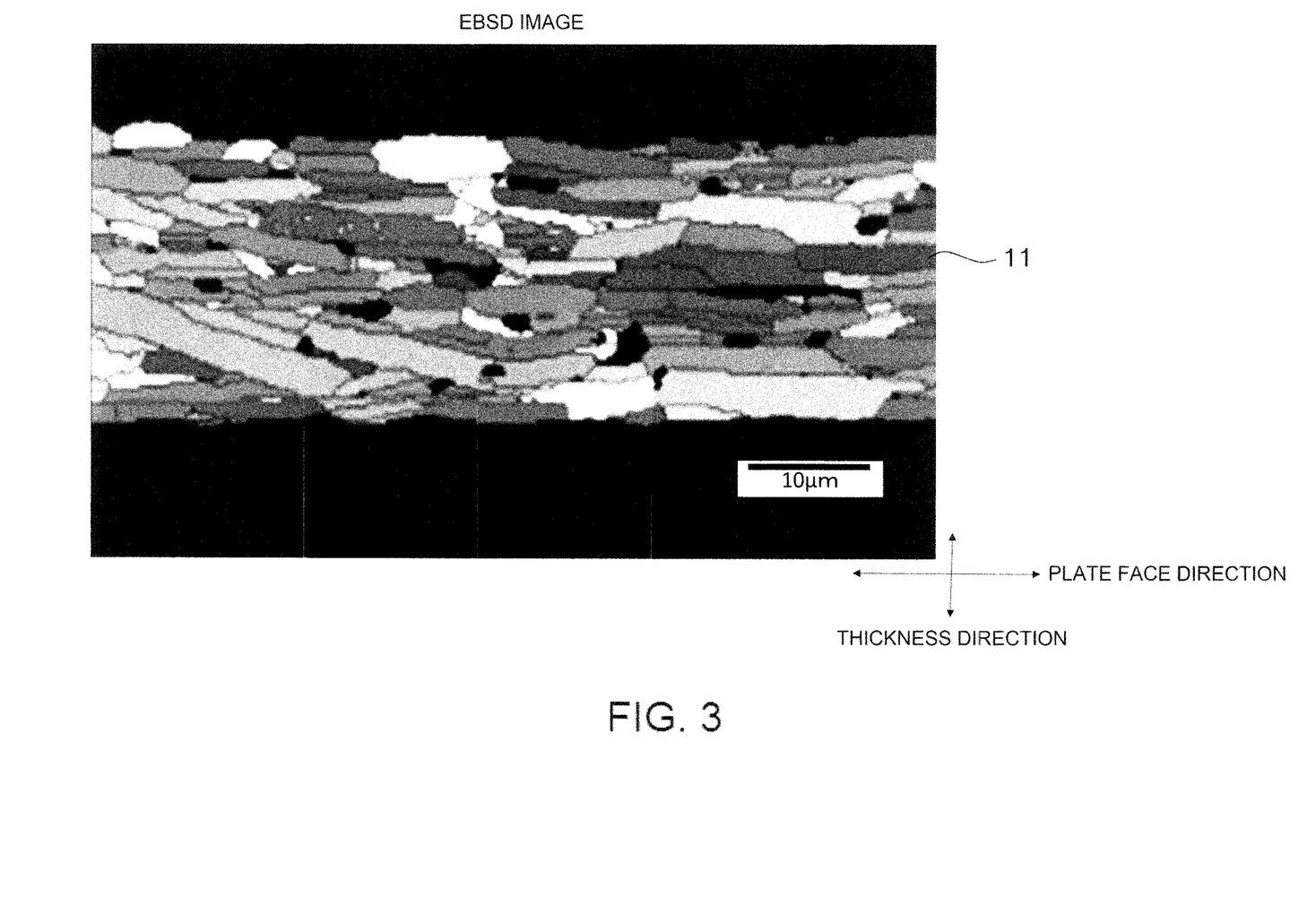
FIG. 3 is an EBSD image in the cross section of the oriented positive electrode layer shown in FIG. 2.
Figure 4:
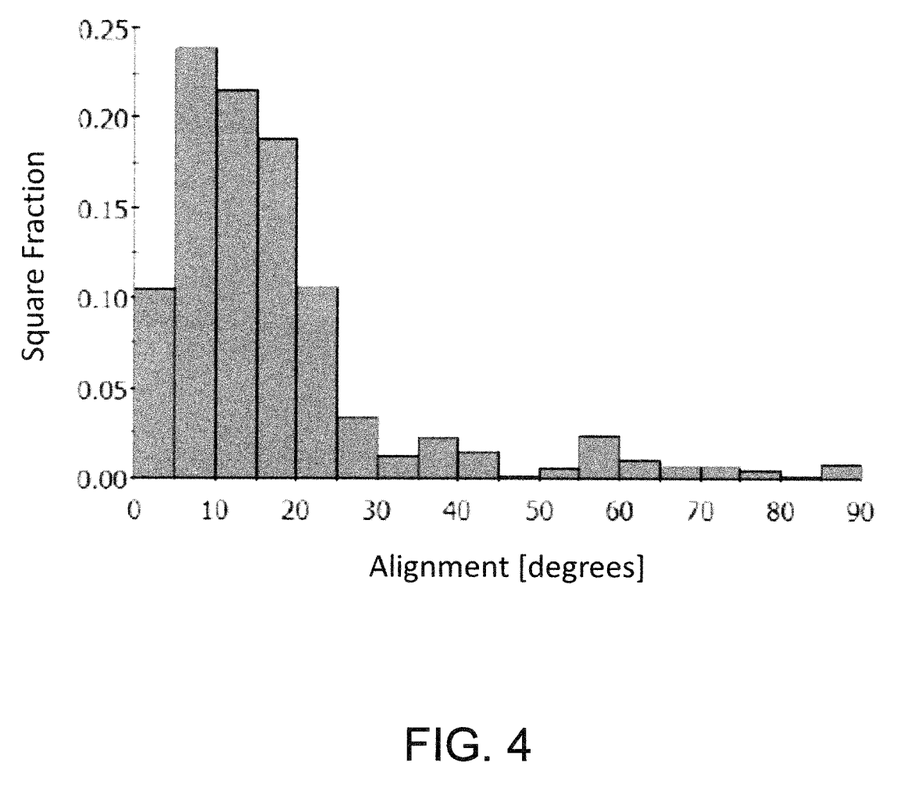
FIG. 4 is an area-based histogram showing the distribution of orientation angles of primary grains in the EBSD image shown in FIG. 3.

According to a preferable aspect of the present invention, the positive electrode layer 12, that is, the lithium complex oxide sintered plate is an oriented positive electrode layer including a plurality of primary grains composed of lithium complex oxide, the plurality of primary grains being oriented at an average orientation angle of over 0° and 30° or less to the layer face of the positive electrode layer. FIG. 2 shows an example of a SEM image in a cross section perpendicular to the layer face of the oriented positive electrode layer 12, and FIG. 3 shows an electron backscatter diffraction (EBSD: Electron Backscatter Diffraction) image in a cross section perpendicular to the layer face of the oriented positive electrode layer 12. Further, FIG. 4 shows an area-based histogram showing the distribution of orientation angles of primary grains 11 in the EBSD image shown in FIG. 3. In the EBSD image shown in FIG. 3, the discontinuity of crystal orientation can be observed. In FIG. 3, the orientation angle of each primary grain 11 is indicated by the shading of color. A darker color indicates a smaller orientation angle. The orientation angle is a tilt angle formed by plane (003) of the primary grains 11 to the layer face direction. In FIGS. 2 and 3, the points shown in black within the oriented positive electrode layer 12 represent pores. FIGS. 2 to 4 show images or data of the samples of the oriented positive electrode layer 12 containing no auxiliary agent. The same orientation state as the above samples is achieved, even in the case where an auxiliary agent (boron or strontium) is contained at a content ratio within the range specified in the present invention.

The oriented positive electrode layer 12 is an oriented sintered body composed of the plurality of primary grains 11 bonded to each other. The primary grains 11 are each mainly in the form of a plate but may include rectangular, cubic, and spherical grains. The cross-sectional shape of each primary grain 11 is not particularly limited and may be a rectangular shape, a polygonal shape other than the rectangular shape, a circular shape, an elliptical shape, or a complex shape other than above.

The primary grains 11 are composed of a cobalt-containing lithium composite oxide. The cobalt-containing lithium composite oxide is a composite oxide containing at least cobalt and lithium and is preferably an oxide represented by $Li_xMO_2$ (where $0.05<x<1.10$ is satisfied, M represents one or more transition metals containing at least Co, and M may contain Ni and/or Mn other than Co). The lithium complex oxide has a layered rock-salt structure. The layered rock-salt structure refers to a crystalline structure in which lithium layers and transition metal layers other than lithium are alternately stacked with oxygen layers interposed therebetween, that is, a crystalline structure in which transition metal ion layers and single lithium layers are alternately stacked with oxide ions therebetween (typically, an $\alpha$-$NaFeO_2$ structure, i.e., a cubic rock-salt structure in which transition metal and lithium are regularly disposed in the [111] axis direction). Examples of the cobalt-containing lithium composite oxide include $Li_xCoO_2$ (lithium cobaltate), $Li_xNiCoO_2$ (lithium nickel cobaltate), $Li_xCoNiMnO_2$ (lithium cobalt nickel manganate), and $Li_xCoMnO_2$ (lithium cobalt manganate), particularly preferably $Li_xCoO_2$ (lithium cobaltate, typically, $LiCoO_2$).

The cobalt-containing lithium composite oxide may further contain B and/or Sr as an auxiliary agent or may further contain one or more elements selected from F, Mg, Al, Si, Ca, Ti, V, Cr, Fe, Cu, Zn, Ga, Ge, Y, Zr, Nb, Mo, Ag, Sn, Sb, Te, Ba, Bi, and W, as other elements. Further, the aforementioned composition may be uniform over the entire positive electrode layer 12 or may be unevenly distributed on the surface. The battery performance (e.g., high temperature durability and storage performance) is expected to be improved by containing such elements.

As shown in FIGS. 3 and 4, the average of the orientation angles of the primary grains 11, that is, the average orientation angle is over 0° and 30° or less. This brings various advantages as follows. First, since each primary grain 11 lies in a direction inclined from the thickness direction, the adhesion between the primary grains can be improved. As a result, the lithium ion conductivity between a certain primary grain 11 and each of other primary grains 11 adjacent to the primary grain 11 on both sides in the longitudinal direction can be improved, so that the rate characteristic can be improved. Secondly, the rate characteristic can be further improved. This is because, when lithium ions move in and out, the oriented positive electrode layer 12 expands and contracts smoothly since the oriented positive electrode layer 12 expands and contracts more in the thickness direction than in the layer face direction, as described above, and thus the lithium ions also move in and out smoothly. Thirdly, since the expansion and contraction of the oriented positive electrode layer 12 following the inflow and outflow of lithium ions are predominant in the direction perpendicular to the layer face, stress is less likely to occur at the bonding interface between the oriented positive electrode layer 12 and the ceramic separator 20, thereby making it easy to maintain good bonding at the interface.

The average orientation angle of the primary grains 11 is obtained by the following method. First, three horizontal lines that divide the oriented positive electrode layer 12 into four equal parts in the thickness direction and three vertical lines that divide the oriented positive electrode layer 12 into four equal parts in the layer face direction are drawn in an EBSD image of a rectangular region of 95 μm×125 μm observed at a magnification of 1000 times, as shown in FIG. 3. Next, the average orientation angle of the primary grains 11 is obtained by arithmetically averaging the orientation angles of all the primary grains 11 intersecting at least one of the three horizontal lines and the three vertical lines. The average orientation angle of the primary grains 11 is preferably 30° or less, more preferably 25° or less, from the viewpoint of further improving the rate characteristics. From the viewpoint of further improving the rate characteristics, the average orientation angle of the primary grains 11 is preferably 2° or more, more preferably 5° or more.

As shown in FIG. 4, the orientation angles of the primary grains 11 may be widely distributed from 0° to 90°, but most of them are preferably distributed in the region of over 0° and 30° or less. That is, when a cross section of the oriented sintered body constituting the oriented positive electrode layer 12 is analyzed by EBSD, the total area of the primary grains 11 with an orientation angle of over 0° and 30° or less to the layer face of the oriented positive electrode layer 12 (which will be hereinafter referred to as low-angle primary grains) out of the primary grains 11 contained in the cross section analyzed is preferably 70% or more, more preferably 80% or more, with respect to the total area of the primary grains 11 contained in the cross section (specifically, 30 primary grains 11 used for calculating the average orientation angle). Thereby, the proportion of the primary grains 11 with high mutual adhesion can be increased, so that the rate characteristic can be further improved. Further, the total area of grains with an orientation angle of 20° or less among the low-angle primary grains is more preferably 50% or more with respect to the total area of 30 primary grains 11 used for calculating the average orientation angle. Further, the total area of grains with an orientation angle of 10° or less among the low-angle primary grains is more preferably 15% or more with respect to the total area of 30 primary grains 11 used for calculating the average orientation angle.

Since the primary grains 11 are each mainly in the form of a plate, the cross section of each primary grain 11 extends in a predetermined direction, typically in a substantially rectangular shape, as shown in FIGS. 2 and 3. That is, when the cross section of the oriented sintered body is analyzed by EBSD, the total area of the primary grains 11 with an aspect ratio of 4 or more in the primary grains 11 contained in the cross section analyzed is preferably 70% or more, more preferably 80% or more, with respect to the total area of the primary grains 11 contained in the cross section (specifically, 30 primary grains 11 used for calculating the average orientation angle). Specifically, in the EBSD image as shown in FIG. 3, the mutual adhesion between the primary grains 11 can be further improved by above, as a result of which the rate characteristic can be further improved. The aspect ratio of each primary grain 11 is a value obtained by dividing the maximum Feret diameter of the primary grain 11 by the minimum Feret diameter. The maximum Feret diameter is the maximum distance between two parallel straight lines that interpose the primary grain 11 therebetween on the EBSD image in observation of the cross section. The minimum Feret diameter is the minimum distance between two parallel straight lines that interpose the primary grain 11 therebetween on the EBSD image.

The mean diameter of the plurality of primary grains constituting the oriented sintered body is preferably 5 μm or more. Specifically, the mean diameter of the 30 primary grains 11 used for calculating the average orientation angle is preferably 5 μm or more, more preferably 7 μm or more, further preferably 12 μm or more. Thereby, since the number of grain boundaries between the primary grains 11 in the direction in which lithium ions conduct is reduced, and the lithium ion conductivity as a whole is improved, the rate characteristic can be further improved. The mean diameter of the primary grains 11 is a value obtained by arithmetically averaging the equivalent circle diameters of the primary grains 11. An equivalent circle diameter is the diameter of a circle having the same area as each primary grain 11 on the EBSD image.

The positive electrode layer 12 preferably includes pores. The electrolytic solution can penetrate into the sintered body by the sintered body including pores, particularly open pores, when the sintered body is integrated into a battery as a positive electrode layer. As a result, the lithium ion conductivity can be improved. This is because there are two types of conduction of lithium ions within the sintered body: conduction through constituent grains of the sintered body; and conduction through the electrolytic solution within the pores, and the conduction through the electrolytic solution within the pores is overwhelmingly faster.

The positive electrode layer 12, that is, the lithium complex oxide sintered body preferably has a porosity of 20 to 60%, more preferably 25 to 55%, further preferably 30 to 50%, particularly preferably 30 to 45%. The stress relief effect by the pores, the improvement in lithium ion conductivity by internal penetration of the electrolytic solution through the pores, and the increase in capacity can be expected, and the mutual adhesion between the primary grains 11 can be further improved, so that the rate characteristics can be further improved. The porosity of the sintered body is calculated by polishing a cross section of the positive electrode layer with CP (cross-section polisher) polishing, thereafter observing the cross section at a magnification of 1000 times with SEM, and binarizing the SEM image obtained. The average equivalent circle diameter of pores formed inside the oriented sintered body is not particularly limited but is preferably 8 μm or less. The smaller the average equivalent circle diameter of the pores, the mutual adhesion between the primary grains 11 can be improved more. As a result, the rate characteristic can be improved more. The average equivalent circle diameter of the pores is a value obtained by arithmetically averaging the equivalent circle diameters of 10 pores on the EBSD image. An equivalent circle diameter is the diameter of a circle having the same area as each pore on the EBSD image. Each of the pores formed inside the oriented sintered body is preferably an open pore connected to the outside of the positive electrode layer 12.

The positive electrode layer 12, that is, the lithium complex oxide sintered body preferably has a mean pore diameter of 0.1 to 10.0 μm, more preferably 0.2 to 5.0 μm, further preferably 0.25 to 3.0 μm. Within such a range, stress concentration is suppressed from occurring locally in large pores, and the stress is easily released uniformly in the sintered body. Further, the improvement in lithium ion conductivity by internal penetration of the electrolytic solution through the pores can be achieved more effectively.

The thickness of the positive electrode layer 12 is preferably 60 to 600 μm, more preferably 60 to 500 μm, further preferably 70 to 400 μm. The thickness within such a range can improve the energy density of the lithium secondary battery 10 by increasing the capacity of the active material per unit area together with suppressing the deterioration of the battery characteristics (particularly, the increase of the resistance value) due to repeated charging/discharging.

The negative electrode layer 16 is composed of a titanium-containing sintered body. The titanium-containing sintered body preferably contains lithium titanate $Li_4Ti_5O_{12}$ (which will be hereinafter referred to as LTO) or niobium titanium complex oxide $Nb_2TiO_7$, more preferably LTO. LTO is typically known to have a spinel structure but can have other structures during charging and discharging. For example, the reaction of LTO proceeds in the two-phase coexistence of $Li_4Ti_5O_{12}$ (spinel structure) and $Li_7Ti_5O_{12}$ (rock salt structure) during charging and discharging. Accordingly, the structure of LTO is not limited to the spinel structure. LTO may be partially replaced with other elements, and examples of the elements include Nb, Ta, W, Al, and Mg.

The fact that the negative electrode layer 16 is composed of a sintered body means that the negative electrode layer 16 contains no binder or conductive agent. This is because, even if a binder is contained in a green sheet, the binder disappears or burns out during firing. Since the negative electrode layer contains no binder, high capacity and good charge/discharge efficiency can be achieved by high packing density of the negative electrode active material (for example, LTO or $Nb_2TiO_7$). The LTO sintered body can be produced according to the method described in Patent Literature 3 (JP2015-185337A).

The negative electrode layer 16, that is, the titanium-containing sintered body has a structure that a plurality (namely, a large number) of primary grains are bonded. Accordingly, these primary grains are preferably composed of LTO or $Nb_2TiO_7$.

The thickness of the negative electrode layer 16 is preferably 70 to 800 μm, more preferably 70 to 700 μm, further preferably 85 to 600 μm, particularly preferably 95 to 500 μm. The larger the thickness of the negative electrode layer 16, a battery with high capacity and high energy density is achieved more easily. The thickness of the negative electrode layer 16 is determined by measuring the distance between the two substantially parallel faces of the layer, for example, when the cross section of the negative electrode layer 16 is observed by SEM (scanning electron microscopy).

The primary grain size that is the average grain size of the plurality of primary grains forming the negative electrode layer 16 is preferably 1.2 µm or less, more preferably 0.02 to 1.2 µm, further preferably 0.05 to 0.7 µm. Within such a range, the lithium ion conductivity and the electron conductivity are easily compatible with each other, which contributes to improving the rate performance.

The negative electrode layer 16 preferably includes pores. The electrolytic solution can penetrate into the sintered body by the sintered body including pores, particularly open pores, when the sintered body is integrated into a battery as a negative electrode layer. As a result, the lithium ion conductivity can be improved. This is because there are two types of conduction of lithium ions within the sintered body: conduction through constituent grains of the sintered body; and conduction through the electrolytic solution within the pores, and the conduction through the electrolytic solution within the pores is overwhelmingly faster.

The negative electrode layer 16 preferably has a porosity of 20 to 60%, more preferably 30 to 55%, further preferably 35 to 50%. Within such a range, the lithium ion conductivity and the electron conductivity are easily compatible with each other, which contributes to improving the rate performance.

The negative electrode layer 16 preferably has a mean pore diameter of 0.08 to 5.0 µm, more preferably 0.1 to 3.0 µm, further preferably 0.12 to 1.5 µm. Within such a range, the lithium ion conductivity and the electron conductivity are easily compatible with each other, which contributes to improving the rate performance.

The ceramic separator 20 is a microporous film made of ceramics. The ceramic separator 20 is advantageous in that it, of course, has excellent heat resistance and can be produced as one integrated sintered plate together with the positive electrode layer 12 and the negative electrode layer 16 as a whole. The ceramic contained in the ceramic separator 20 is preferably at least one selected from MgO, $Al_2O_3$, $ZrO_2$, SiC, $Si_3N_4$, AlN, and cordierite, more preferably at least one selected from MgO, $Al_2O_3$, and $ZrO_2$, further preferably MgO. Use of MgO gives an advantage that the compositional change of the positive electrode layer 12, the negative electrode layer 16, and the ceramic separator 20 due to diffusion of the components of the positive electrode layer 12 and the negative electrode layer 16 into the ceramic separator 20 can be suppressed. The thickness of the ceramic separator 20 is preferably 3 to 50 µm, more preferably 5 to 40 µm, further preferably 5 to 35 µm, particularly preferably 10 to 30 µm. The porosity of the ceramic separator 20 is preferably 30 to 85%, more preferably 40 to 80%.

The ceramic separator 20 may contain a glass component for improving the adhesion between the positive electrode layer 12 and the negative electrode layer 16. In this case, the content ratio of the glass component in the ceramic separator 20 is preferably 0.1 to 50 wt %, more preferably 0.5 to 40 wt %, further preferably 0.5 to 30 wt %, with respect to the entire weight of the ceramic separator 20. The glass contains $SiO_2$ in an amount of preferably 25 wt % or more, more preferably 30 to 95 wt %, further preferably 40 to 90 wt %, particularly preferably 50 to 80 wt %. The addition of the glass component to the ceramic separator 20 is preferably performed by adding glass frit to the raw material powder of the ceramic separator. The glass frit preferably contains at least one or more of $Al_2O_3$, $B_2O_3$, and BaO, as a component other than $SiO_2$. However, if the desired adhesion of the ceramic separator 20 with the positive electrode layer 12 and the negative electrode layer 16 can be ensured, the inclusion of the glass component in the ceramic separator 20 is not particularly required.

The electrolytic solution 22 is not specifically limited, and commercially available electrolytic solutions for lithium batteries such as a solution obtained by dissolving a lithium salt (e.g., $LiPF_6$) in a non-aqueous solvent such as an organic solvent (e.g., a mixed solvent of ethylene carbonate (EC) and methyl ethyl carbonate (MEC), a mixed solvent of ethylene carbonate (EC) and diethyl carbonate (DEC), or a mixed solvent of ethylene carbonate (EC) and ethyl methyl carbonate (EMC)) may be used.

In the case of forming a lithium secondary battery having excellent heat resistance, the electrolytic solution 22 preferably contains lithium borofluoride ($LiBF_4$) in a non-aqueous solvent. In this case, the non-aqueous solvent is preferably at least one selected from the group consisting of γ-butyrolactone (GBL), ethylene carbonate (EC) and propylene carbonate (PC), more preferably a mixed solvent composed of EC and GBL, a single solvent composed of PC, a mixed solvent composed of PC and GBL, or a single solvent composed of GBL, particularly preferably a mixed solvent composed of EC and GBL or a single solvent composed of GBL. The non-aqueous solvent has an increased boiling point by containing γ-butyrolactone (GBL), which considerably improves the heat resistance. From such a viewpoint, the volume ratio of EC:GBL in the EC and/or GBL containing non-aqueous solvent is preferably 0:1 to 1:1 (GBL ratio: 50 to 100% by volume), more preferably 0:1 to 1:1.5 (GBL ratio: 60 to 100% by volume), further preferably 0:1 to 1:2 (GBL ratio: 66.6 to 100% by volume), particularly preferably 0:1 to 1:3 (GBL ratio: 75 to 100% by volume). The lithium borofluoride ($LiBF_4$) to be dissolved in the non-aqueous solvent is an electrolyte having a high decomposition temperature, which also considerably improves the heat resistance. The $LiBF_4$ concentration in the electrolytic solution 22 is preferably 0.5 to 2 mol/L, more preferably 0.6 to 1.9 mol/L, further preferably 0.7 to 1.7 mol/L, particularly preferably 0.8 to 1.5 mol/L.

The electrolytic solution 22 may further contain at least one selected from vinylene carbonate (VC), fluoroethylene carbonate (FEC), vinyl ethylene carbonate (VEC), and lithium difluoro(oxalato)borate (LiDFOB), as an additive. Both VC and FEC have excellent heat resistance. Accordingly, a SEI film having excellent heat resistance can be formed on the surface of the negative electrode layer 16 by the electrolytic solution 22 containing such additives.

Further, a solid electrolyte or a polymer electrolyte may be used instead of the electrolytic solution 22 (in other words, a solid electrolyte and a polymer electrolyte can be used as an electrolyte, other than the electrolytic solution 22). In such a case, at least the inside of the pores of the separator 20 is preferably impregnated with the electrolyte, as in the case of the electrolytic solution 22. The impregnation method is not specifically limited, but examples thereof include a method of melting the electrolyte and infiltrating it into the pores of the separator 20 and a method of pressing the green compact of the electrolyte against the separator 20.

The exterior body 24 includes a closed space, and the closed space accommodates the positive electrode layer 12, the negative electrode layer 16, the ceramic separator 20, and the electrolytic solution 22. The exterior body 24 may be appropriately selected corresponding to the type of the lithium secondary battery 10. For example, in the case where the lithium secondary battery is in a form of coin-shaped battery as shown in FIG. 1, the exterior body 24 typically includes the positive electrode can 24a, the negative electrode can 24b, and the gasket 24c, and the positive electrode can 24a and the negative electrode can 24b are crimped via the gasket 24c to form the closed space. The positive electrode can 24a and the negative electrode can 24b can be made of metals such as stainless steel and are not specifically limited. The gasket 24c can be an annular member made of an insulating resin such as polypropylene, polytetrafluoroethylene, and PFA resin and is not particularly limited.

Further, in the case where the lithium secondary battery is in a form of chip battery that can be incorporated in a card, it is preferable that the exterior body is a resin substrate, and the battery elements (that is, the positive electrode layer 12, the negative electrode layer 16, the ceramic separator 20, and the electrolytic solution 22) are embedded in the resin substrate. For example, the battery elements may be sandwiched by a pair of resin films, and it is preferable that the resin films are bonded together by an adhesive, or the resin films are thermally fused together by hot pressing.

The lithium secondary battery 10 preferably further includes a positive electrode current collector 14 and/or a negative electrode current collector 18. The positive electrode current collector 14 and the negative electrode current collector 18 are not specifically limited but are preferably metal foils such as copper foils and aluminum foils. The positive electrode current collector 14 is preferably interposed between the positive electrode layer 12 and the exterior body 24 (e.g., the positive electrode can 24a), and the negative electrode current collector 18 is preferably interposed between the negative electrode layer 16 and the exterior body 24 (e.g., the negative electrode can 24b). Further, a positive side carbon layer 13 is preferably provided between the positive electrode layer 12 and the positive electrode current collector 14 for reducing the contact resistance. Likewise, a negative side carbon layer 17 is preferably provided between the negative electrode layer 16 and the negative electrode current collector 18 for reducing the contact resistance. Both the positive side carbon layer 13 and the negative side carbon layer 17 are preferably composed of a conductive carbon and may be formed, for example, by applying a conductive carbon paste by screen printing or the like.

Method for Producing Integrated Sintered Plate

The integrated sintered plate with a three-layer structure of the positive electrode layer 12, the ceramic separator 20, and the negative electrode layer 16 may be produced by any method but is preferably produced by (1) preparation green sheets corresponding to the respective three layers and (2) laminating the green sheets, followed by pressure bonding and firing.

(1) Preparation of Various Green Sheets (1a) Preparation of Positive Electrode Green Sheet A lithium complex oxide-containing green sheet as a positive electrode green sheet can be prepared, as follows. A raw material powder composed of lithium complex oxide is prepared. The powder preferably comprises pre-synthesized platy particles (e.g., $LiCoO_2$ platy particles) having a composition of $LiMO_2$ (M as described above). The volume-based D50 particle diameter of the raw material powder is preferably 0.3 to 30 μm. For example, the $LiCoO_2$ platy particles can be produced as follows. $Co_3O_4$ powder and $Li_2CO_3$ powder as raw materials are mixed and fired (500 to 900° C., 1 to 20 hours) to synthesize $LiCoO_2$ powder. The resultant $LiCoO_2$ powder is milled into a volume-based D50 particle diameter of 0.2 μm to 10 μm with a pot mill to yield platy $LiCoO_2$ particles capable of conducting lithium ions along the faces of the plate. Such $LiCoO_2$ particles are also produced by a procedure involving grain growth in a green sheet from $LiCoO_2$ powder slurry and crushing the green sheet, or a procedure involving synthesis of platy crystals, such as a flux process, a hydrothermal synthesis process, a single crystal growth process using a melt, and a sol gel process. The resultant $LiCoO_2$ particles are readily cleaved along cleavage planes. The $LiCoO_2$ particles may be cleaved by crushing to produce $LiCoO_2$ platy particles.

The platy particles may be independently used as raw material powder, or a mixed powder of the platy powder and another raw material powder (for example, $Co_3O_4$ particles) may be used as a raw material powder. In the latter case, it is preferred that the platy powder serves as template particles for providing orientation, and another raw material powder (e.g., $Co_3O_4$ particles) serves as matrix particles that can grow along the template particle. In this case, the raw powder is preferably composed of a mixed powder in a ratio of template particles to matrix particles of 100:0 to 3:97. When the $Co_3O_4$ raw material powder is used as the matrix particles, the volume-based D50 particle diameter of the $Co_3O_4$ raw material powder may be any value, for example, 0.1 to 1.0 μm, and is preferably smaller than the volume-based D50 particle diameter of $LiCoO_2$ template particles. The matrix particles may also be produced by heating a $Co(OH)_2$ raw material at 500° C. to 800° C. for 1 to 10 hours. In addition to $Co_3O_4$, $Co(OH)_2$ particles may be used, or $LiCoO_2$ particles may be used as the matrix particles.

When the raw material powder is composed of 100% of $LiCoO_2$ template particles, or when $LiCoO_2$ particles are used as matrix particles, a large (e.g., 90 mm×90 mm square) flat $LiCoO_2$ sintered layer can be yielded by firing. Although the mechanism is not clear, since synthesis of $LiCoO_2$ does not proceed in a firing process, a change in volume or local unevenness of the shape probably does not occur.

Boron compound powder or strontium compound powder is added and mixed to the raw material powder, as an auxiliary agent, followed by milling, to give mixed powder. The boron compound and the strontium compound used as an auxiliary agent is preferably a compound that does not leave unwanted impurities other than boron and strontium after firing. Preferable examples of the boron compound include $H_3BO_3$, $B_2O_3$, $Li_3BO_3$, and $LiBO_2$, more preferably $H_3BO_3$. Preferable examples of the strontium compound include $SrCO_3$, $SrO$, $Sr(NO_3)$, $SrSO_4$, and $Sr(OH)_2$, more preferably $SrO$. The amount of the boron compound powder to be added may be such that the content ratio of boron is 0.05 to 2.0 mol % with respect to the content of cobalt in the lithium composite oxide sintered body that constitutes the positive electrode layer when formed as an integrated sintered plate. Further, the amount of the strontium compound powder to be added may be such that the content ratio of strontium is 0.05 to 1.2 mol % with respect to the content of cobalt in the lithium composite oxide sintered body that constitutes the positive electrode layer when formed as an integrated sintered plate.

The resultant mixed powder is further mixed with a dispersion medium and various additives (such as binders, plasticizers, and dispersants) to form a slurry. A lithium compound (e.g., lithium carbonate) in an excess amount of about 0.5 to 30 mol % other than $LiMO_2$ may be added to the slurry to promote grain growth and compensate for a volatile component in a firing process described later. The slurry preferably contains no pore-forming agent. The slurry is defoamed by stirring under reduced pressure, and the viscosity is preferably adjusted into 4000 to 10000 cP. The resultant slurry is formed into a sheet to obtain a green sheet containing a lithium composite oxide and an auxiliary agent. The sheet is preferably formed by a forming procedure capable of applying a shear force to platy particles (for example, template particles) in the raw material powder.

Through this process, the primary grains can have a mean tilt angle of over 0° and 30° or less to the sheet face. The forming procedure capable of applying a shear force to platy particles suitably includes a doctor blade process. The thickness of the green sheet that contains a lithium composite oxide and an auxiliary agent may be appropriately set so that the thickness after firing should be the aforementioned desired thickness. Further, one piece of green sheet may be formed into the desired thickness, or a plurality of pieces of green sheets may be laminated to the desired thickness. In particular, in the case where the thickness is over 300 μm, it is preferable to laminate a plurality of pieces of green sheets in view of the construction method.

(1b) Preparation of Negative Electrode Green Sheet

A titanium-containing green sheet as a negative electrode green sheet may be produced by any method. For example, a LTO-containing green sheet can be prepared, as follows. First, raw material powder (LTO powder) composed of lithium titanate $Li_4Ti_5O_{12}$ is prepared. Commercially available or newly synthesized LTO powder may be used as the raw material powder. For example, powder obtained by hydrolyzing a mixture of titanium tetraisopropoxy alcohol and isopropoxy lithium may be used, or a mixture containing lithium carbonate, titania, or the like may be fired. The raw material powder preferably has a volume-based D50 particle size of 0.05 to 5.0 μm, more preferably 0.1 to 2.0 μm. A larger particle size of the raw material powder tends to increase the size of the pores. Further, in the case where the particle size of the raw material is large, milling (such as pot milling, bead milling, and jet milling) may be performed to a desired particle size. The raw material powder is mixed with a dispersive medium and any additive (e.g., binder, plasticizer, and dispersant) to form a slurry. A lithium compound (e.g., lithium carbonate) in an excess amount of about 0.5 to 30 mol % other than $LiMO_2$ may be added to the slurry to promote grain growth and compensate for a volatile component in a firing process described later. The slurry preferably contains no pore-forming agent. The slurry is defoamed by stirring under reduced pressure, and the viscosity is preferably adjusted into 4000 to 10000 cP. The resultant slurry is formed into a LTO-containing green sheet. The sheet can be formed by any known process and is preferably formed by a doctor blade process. The thickness of the LTO-containing green sheet may be appropriately selected so as to give the above desired thickness after firing.

(1c) Preparation of Separator Green Sheet

A separator green sheet can be prepared, as follows. First, at least one ceramic powder selected from MgO, $Al_2O_3$, $ZrO_2$, SiC, $Si_3N_4$, AlN, and cordierite is prepared. Glass frit may be added to this ceramic powder. The raw material powder preferably has a volume-based D50 particle size of 0.05 to 20 μm, more preferably 0.1 to 10 μm. A larger particle size of the raw material powder tends to increase the size of the pores. Further, in the case where the particle size of the raw material is large, milling (such as pot milling, bead milling, and jet milling) may be performed to a desired particle size. The raw material powder is mixed with a dispersive medium and any additive (e.g., binder, plasticizer, and dispersant) to form a slurry. The slurry is defoamed by stirring under reduced pressure, and the viscosity is preferably adjusted into 4000 to 10000 cP. The resultant slurry is formed into a separator green sheet. The sheet can be formed by any known process and is preferably formed by a doctor blade process. The thickness of the separator green sheet may be appropriately selected so as to give the above desired thickness after firing.

(2) Lamination, Pressure Bonding, and Firing of Green Sheets

Then, the positive electrode green sheet, the separator green sheet, and the negative electrode green sheet are sequentially stacked, and the laminate obtained is pressed so that the green sheets are pressure-bonded together. The pressing may be performed by a known method and is not specifically limited but is preferably performed by CIP (cold isostatic pressing). The pressing pressure is preferably 10 to 5000 $kgf/cm^2$, more preferably 50 to 3000 $kgf/cm^2$. The green sheet laminate thus pressure-bonded is preferably punched into a desired shape (such as a coin shape and a chip shape) or size using a punching die. Thereby, the displacement between the positive electrode layer 12 and the negative electrode layer 16 can be eliminated in the integrated sintered plate in the final form. As a result, the end face of the positive electrode layer 12 and the end face of the negative electrode layer 16 are aligned, so that the battery capacity can be maximized.

The green sheet laminate obtained is placed on a setter. The setter is made of ceramics, preferably zirconia or magnesia. The setter is preferably embossed. The green sheet disposed on the setter is put into a sheath. The sheath is made of ceramics, preferably alumina. Then, the green sheet in this state is degreased, as needed, and fired to obtain an integrated sintered plate. The degreasing is preferably performed at 300 to 600° C. for 0.5 to 20 hours. Further, the firing is preferably performed at 650 to 900° C. for 0.01 to 20 hours, more preferably at 700 to 850° C. for 0.5 to 10 hours. The heating rate during firing is preferably 50 to 1500° C./h, more preferably 200 to 1300° C./h. In particular, this heating rate is preferably employed in a temperature rising process from 600 to 900° C., more preferably from 600 to 800° C. Thus, an integrated sintered plate having a three-layer structure of the positive electrode layer 12, the ceramic separator 20, and the negative electrode layer 16 is obtained. In the case where the punching process is not performed at the stage of the green sheet laminate, a displacement between the positive electrode layer 12 and the negative electrode layer 16 can occur in the integrated sintered plate in the final form. In this case, the end face of the integrated sintered plate is preferably finished by a technique such as laser processing, cutting, and polishing, to minimize or eliminate the aforementioned displacement. As a result, the end face of the positive electrode layer 12 and the end face of the negative electrode layer 16 are aligned, so that the battery capacity can be maximized.

EXAMPLES

The invention will be illustrated in more detail by the following examples. In the following examples, $LiCoO_2$ will be abbreviated as "LCO", and $Li_4Ti_5O_{12}$ will be abbreviated as "LTO".

Example A1 to A12

(1) Preparation of LCO Green Sheet (Positive Electrode Green Sheet)

First, $Co_3O_4$ powder (manufactured by SEIDO CHEMICAL INDUSTRY CO., LTD.) and $Li_2CO_3$ powder (manufactured by THE HONJO CHEMICAL CORPORATION) weighed to a molar ratio Li/Co of 1.01 were mixed, and thereafter the mixture was kept at 780° C. for 5 hours. The resultant powder was milled into a volume-based D50 of 0.4 μm with a pot mill to yield powder composed of platy LCO particles. At this time, in Examples A2 to A7, $H_3BO_3$ (manufactured by KANTO CHEMICAL CO., INC.) as a B-based auxiliary agent was added and mixed so that the content ratio of B (mol %) was each value shown in Table 1 with respect to 100 mol % of the Co content, followed by milling, to obtain LCO mixed powder. Likewise, in Examples A8 to A12, SrO (manufactured by KISHIDA CHEMICAL Co., Ltd.) as a Sr-based auxiliary agent was added and mixed so that the content ratio of Sr (mol %) was each value shown in Table 1 with respect to 100 mol % of the Co content, followed by milling, to obtain LCO mixed powder. The content ratio of B or Sr with respect to Co at this time equally applies to the lithium composite oxide sintered body that constitutes the positive electrode layer when formed as an integrated sintered plate.

The resultant LCO powder (Example A1) or LCO mixed powder (Examples A2 to A12) (100 parts by weight), a dispersive medium (toluene:isopropanol=1:1) (100 parts by weight), a binder (polyvinyl butyral: Product No. BM-2, manufactured by SEKISUI CHEMICAL CO., LTD.) (10 parts by weight), a plasticizer (di-2-ethylhexyl phthalate (DOP), manufactured by Kurogane Kasei Co., Ltd.) (4 parts by weight), and a dispersant (product name: RHEODOL SP-O30, manufactured by Kao Corporation) (2 parts by weight) were mixed. The resultant mixture was defoamed by stirring under reduced pressure to prepare a LTO slurry with a viscosity of 4000 cP. The viscosity was measured with an LVT viscometer manufactured by Brookfield. The slurry prepared was formed into a LCO green sheet onto a PET film by a doctor blade process. The thickness of the LCO green sheet was adjusted to 60 μm after firing.

(2) Preparation of LTO Green Sheet (Negative Electrode Green Sheet)

First, LTO powder (volume-based D50 particle size: 0.06 μm, manufactured by Sigma-Aldrich Japan) (100 parts by weight), a dispersive medium (toluene:isopropanol=1:1) (100 parts by weight), a binder (polyvinyl butyral: Product No. BM-2, manufactured by SEKISUI CHEMICAL CO., LTD.) (20 parts by weight), a plasticizer (di-2-ethylhexyl phthalate (DOP), manufactured by Kurogane Kasei Co., Ltd.) (4 parts by weight), and a dispersant (product name: RHEODOL SP-O30, manufactured by Kao Corporation) (2 parts by weight) were mixed. The resultant negative electrode raw material mixture was defoamed by stirring under reduced pressure to prepare a LTO slurry with a viscosity of 4000 cP. The viscosity was measured with an LVT viscometer manufactured by Brookfield. The slurry prepared was formed into a LTO green sheet onto a PET film by a doctor blade process. The thickness of the LTO green sheet was adjusted to 70 μm after firing.

(3) Preparation of MgO Green Sheet (Separator Green Sheet)

Magnesium carbonate powder (manufactured by Konoshima Chemical Co., Ltd.) was heated at 900° C. for 5 hours to obtain MgO powder. The resultant MgO powder and glass frit (CK0199, manufactured by Nippon Frit Co., Ltd.) were mixed at a weight ratio of 4:1. The resultant mixed powder (volume-based D50 particle size: 0.4 μm) (100 parts by weight), a dispersive medium (toluene:isopropanol=1:1) (100 parts by weight), a binder (polyvinyl butyral: Product No. BM-2, manufactured by SEKISUI CHEMICAL CO., LTD.) (20 parts by weight), a plasticizer (di-2-ethylhexyl phthalate (DOP), manufactured by Kurogane Kasei Co., Ltd.) (4 parts by weight), and a dispersant (product name: RHEODOL SP-O30, manufactured by Kao Corporation) (2 parts by weight) were mixed. The resultant raw material mixture was defoamed by stirring under reduced pressure to prepare a slurry with a viscosity of 4000 cP. The viscosity was measured with an LVT viscometer manufactured by Brookfield. The slurry prepared was formed into a separator green sheet onto a PET film by a doctor blade process. The thickness of the separator green sheet was adjusted to 25 μm after firing.

(4) Lamination, Pressure Bonding, and Firing

The LCO green sheet (positive electrode green sheet), the MgO green sheet (separator green sheet), and the LTO green sheet (negative electrode green sheet) were sequentially stacked, and the resultant laminate was pressed by CIP (cold isostatic pressing) at 200 kgf/cm$^2$ so that the green sheets were pressure-bonded together. The laminate thus pressure-bonded was punched into a circular plate with a diameter of 10 mm using a punching die. The resultant laminate in a form of circular plate was degreased at 600° C. for 5 hours, then heated to 800° C. at 1000° C./h, and kept for 10 minutes to fire, followed by cooling. Thus, one integrated sintered plate including three layers of a positive electrode layer (LCO sintered layer) 12, a ceramic separator (MgO separator) 20, and a negative electrode layer (LTO sintered layer) 16 was obtained.

(5) Production of Lithium Secondary Battery

The coin-shaped lithium secondary battery 10 as schematically shown in FIG. 1 was produced as follows.

(5a) Adhesion of Negative Electrode Layer and Negative Electrode Current Collector with Conductive Carbon Paste Acetylene black and polyimide amide were weighed to a mass ratio of 3:1 and mixed with an appropriate amount of NMP (N-methyl-2-pyrrolidone) as a solvent, to prepare a conductive carbon paste as a conductive adhesive. The conductive carbon paste was screen-printed on an aluminum foil as a negative electrode current collector. The integrated sintered body produced in (4) above was disposed so that the negative electrode layer 16 was located within an undried printing pattern (that is, a region coated with the conductive carbon paste), followed by vacuum drying at 60° C. for 30 minutes, to produce a structure with the negative electrode layer 16 and the negative electrode current collector 18 bonded via the negative side carbon layer 17. The negative side carbon layer 17 had a thickness of 10 μm.

(5b) Preparation of Positive Electrode Current Collector with Carbon Layer

Acetylene black and polyimide amide were weighed to a mass ratio of 3:1 and mixed with an appropriate amount of NMP (N-methyl-2-pyrrolidone) as a solvent, to prepare a conductive carbon paste. The conductive carbon paste was screen-printed on an aluminum foil as a positive electrode current collector 14, followed by vacuum drying at 60° C. for 30 minutes, to produce a positive electrode current collector 14 with a positive side carbon layer 13 formed on a surface. The positive side carbon layer 13 had a thickness of 5 μm.

(5c) Assembling of Coin-Shaped Battery

The positive electrode current collector 14, the positive side carbon layer 13, the integrated sintered plate (the LCO positive electrode layer 12, the MgO separator 20, and the LTO negative electrode layer 16), the negative side carbon layer 17, and the negative electrode current collector 18 were accommodated between the positive electrode can 24a and the negative electrode can 24b, which would form a battery case, so as to be stacked in this order from the positive electrode can 24a toward the negative electrode can 24b, and an electrolytic solution 22 was filled therein. Thereafter, the positive electrode can 24a and the negative electrode 24b can were crimped via a gasket 24c to be sealed. Thus, the coin cell-shaped lithium secondary battery 10 with a diameter of 12 mm and a thickness of 1.0 mm was produced. At this time, the electrolytic solution 22 was a solution of LiBF4 (1.5 mol/L) in a mixed organic solvent of ethylene carbonate (EC) and γ-butyrolactone (GBL) at 1:3 (volume ratio).

(6) Evaluation

The one integrated sintered plate synthesized in Procedure (4) above that includes three layers of the LCO sintered layer (positive electrode layer) 12, the LTO sintered layer (negative electrode layer) 16, and the MgO separator (ceramic separator) 20 and the coin-shaped lithium secondary battery 10 manufactured in Procedure (5) above were evaluated for various properties as shown below.

<Discharge Capacity>

The discharge capacity of the battery was measured by the following procedures. That is, the battery was charged at a constant voltage of 2.7 V and then discharged at a discharge rate of 0.2 C to measure the initial capacity, and the resultant initial capacity was employed as a discharge capacity.

<Amount of Warpage>

Figure 5:
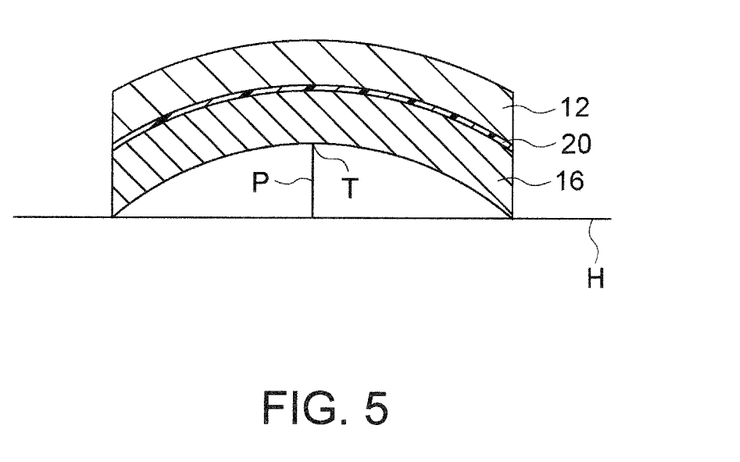
FIG. 5 is a conceptual diagram for explaining the amount of warpage measured in Examples A1 to A12.

In order to measure the amount of warpage in the integrated sintered plate, the integrated sintered plate was placed on a horizontal plane H so that the positive electrode layer 12 forming a convex surface faced upward (the negative electrode layer 16 forming a concave surface faced downward), as shown in FIG. 5, and the length of a perpendicular line P drawn from the highest position T of the concave surface of the negative electrode layer 16 with reference to the horizontal plane H to the horizontal plane H was measured as an amount of warpage (μm). The amount of warpage was measured with a One-shot 3D Measuring Macroscope (VR3000, manufactured by KEYENCE CORPORATION). Those with an amount of warpage of 50 μm or less were determined to be acceptable. In the case where the negative electrode layer 16 warped to form a convex surface (the positive electrode layer 12 warped to form a concave surface), as being different from FIG. 5, the warpage was measured by a technique similar to above but by placing the integrated sintered plate on the horizontal plane H so that the negative electrode layer 16 forming a convex surface faced upward (the positive electrode layer 12 forming a concave surface faced downward).

Evaluation Results

Table 1 shows the evaluation results for Examples A1 to A12.

TABLE 1

Table 1

| Type of auxiliary agent | Content ratio of auxiliary agent M to Co (M/Co) × 100, provided that M is B or Sr (mol %) | Capacity (mAh) | Amount of warpage (μm) |
|---|---|---|---|
| Example A1 * | None | 0 | 5.5 | 120 |
| Example A2 | B | 0.2 | 5.5 | 35 |
| Example A3 | B | 0.5 | 5.5 | 18 |
| Example A4 | B | 1.0 | 5.4 | 10 |
| Example A5 | B | 1.8 | 5.3 | 4 |
| Example A6 | B | 0.05 | 5.5 | 44 |
| Example A7 * | B | 3.0 | 4.8 | 0 |
| Example A8 | Sr | 0.2 | 5.4 | 30 |
| Example A9 | Sr | 0.5 | 5.3 | 14 |
| Example A10 | Sr | 1.0 | 5.2 | 6 |
| Example A11 | Sr | 0.05 | 5.5 | 48 |
| Example A12 * | Sr | 1.5 | 4.7 | 3 |

Symbol * represents a comparative example.

Hereinafter, Reference Examples or Comparative Examples for demonstrating that batteries using an integrated sintered plate (however, no auxiliary agent was added to the LCO sintered body layer (positive electrode layer)) have more excellent performance than assembled batteries using no integrated sintered plate are shown.

Example B1 (Reference)

An integrated sintered plate and a battery were produced as in Example A1, and various evaluations were performed thereon as described below.

<Average Orientation Angle of Primary Grains>

The LCO sintered layer was polished with a cross-section polisher (CP) (IB-15000CP, manufactured by JEOL Ltd.), and the resultant cross section of the positive electrode layer (cross section perpendicular to the layer face of the positive electrode layer) was subjected to the EBSD measurement at a 1000-fold field of view (125 μm×125 μm) to give an EBSD image. This EBSD measurement was performed using a Schottky field emission scanning electron microscope (model JSM-7800F, manufactured by JEOL Ltd.). For all grains identified in the resultant EBSD image, the angles defined by the (003) planes of the primary grains and the layer face of the positive electrode layer (that is, the tilt of the crystal orientation from the (003) planes) is determined as a tilt angle. The mean value of the angles was determined as an average orientation angle of the primary grains.

<Layer Thickness>

The LCO and LTO sintered layers and the MgO separator were polished with a cross-section polisher (CP) (IB-15000CP, manufactured by JEOL Ltd.), and the resultant cross-sections were observed with SEM (JSM6390LA, manufactured by JEOL Ltd.) to determine the thickness of the positive electrode layer, the negative electrode layer, and the separator.

<Porosity>

The LCO or LTO sintered layer and the MgO separator were polished with a cross-section polisher (CP) (IB-15000CP, manufactured by JEOL Ltd.), and the resultant cross section of the positive electrode layer or the negative electrode layer was observed with SEM (JSM6390LA, manufactured by JEOL Ltd.) at a 1000-fold field of view (125 μm×125 μm). The SEM image was subjected to an image analysis, the area of all pores was divided by the area of the positive electrode or the negative electrode, and the resultant value was multiplied by 100 to calculate the porosity (%).

<Mean Pore Diameter>

The mean pore diameters of the LCO or LTO sintered layer were measured by a mercury intrusion method using a mercury porosimeter (Autopore IV 9510, manufactured by Shimadzu Corporation).

<Area Displacement Ratio Between Positive and Negative Electrodes>

The area displacement ratio between the positive electrode layer and the negative electrode layer in the battery was calculated. Specifically, the area displacement ratio (%) between the positive and negative electrodes was calculated based on the formula: $[(S_p+S_n)/S_{pn}] \times 100$ by measuring the area $S_{pn}$ of the region where the positive electrode layer and the negative electrode layer overlap each other, the area $S_p$ of the region where the positive electrode layer protrudes from the negative electrode layer, and the area $S_n$ of the region where the negative electrode layer protrudes from the positive electrode layer. The areas $S_{pn}$, $S_p$, and $S_n$ were measured and calculated by determining the shape from both sides of each sample using a 3D shape measuring machine (VR3000, manufactured by KEYENCE CORPORATION).

<Discharge Capacity/Theoretical Capacity Ratio>

The discharge capacity of the battery was measured by the following procedures. That is, the battery was charged at a constant voltage of 2.7 V and then discharged at a discharge rate of 0.2 C to measure the initial capacity, and the resultant initial capacity was employed as a discharge capacity. Then, the discharge capacity was divided by the theoretical capacity and multiplied by 100, to obtain a discharge capacity/theoretical capacity ratio (%).

The theoretical capacity of the battery was calculated by the following procedures. First, the area of each layer of integrated sintered plate was calculated by the shape measurement, and the thickness and porosity of each layer of the integrated sintered plate were calculated from the cross-section SEM, to calculate the effective volumes of the positive electrode layer and the negative electrode layer from the values obtained. The true specific gravity of each constituent of the positive electrode layer and the negative electrode layer was calculated based on JIS standard R1634, and the weight values of the positive electrode layer and the negative electrode layer were calculated. The theoretical capacity value of each of the positive electrode layer and the negative electrode layer was calculated by multiplying the weight of each active material thus obtained by the capacity per weight of the material (described in the battery handbook), and the lower value was employed as the theoretical capacity value of the battery.

<Pulse Cycle Capacity Retention Rate>

The pulse cycle capacity retention rate (constant voltage charge cycle performance) of the battery was measured by the following procedures. First, the battery was charged at a constant voltage of 2.7 V and discharged at a discharge rate of 0.2 C to measure the initial capacity. Then, a total of 100 charge/discharge cycles including 100 times of charging at a constant voltage of 2.7 V and discharging at a current of 20 mA for 0.5 seconds were conducted. Finally, the battery was charged at a constant voltage of 2.7 V and discharged at 0.2 C, to measure the capacity after cycles. The capacity after cycles measured was divided by the initial capacity and multiplied by 100, to determine the pulse cycle capacity retention rate (%).

Example B2 (Reference)

An integrated sintered plate and a battery were prepared and evaluated for the various properties as in Example B1 except that 1) the thickness of the LCO green sheet was increased so that the thickness of the positive electrode layer was 100 μm, and 2) the thickness of the LTO green sheet was increased so that the thickness of the negative electrode layer was 120 μm.

Example B3 (Reference)

An integrated sintered plate and a battery were prepared and evaluated for the various properties as in Example B1 except that 1) the thickness of the LCO green sheet was increased so that the thickness of the positive electrode layer was 200 μm, and 2) the thickness of the LTO green sheet was increased so that the thickness of the negative electrode layer was 240 μm.

Example B4 (Reference)

An integrated sintered plate and a battery were prepared and evaluated for the various properties as in Example B1 except that 1) the thickness of the LCO green sheet was increased so that the thickness of the positive electrode layer was 400 μm, and 2) the thickness of the LTO green sheet was increased so that the thickness of the negative electrode layer was 480 μm.

Example B5 (Reference)

An integrated sintered plate and a battery were prepared and evaluated for the various properties as in Example B4 except that the mean pore diameter of the positive electrode layer was adjusted to 0.25 μm.

Example B6 (Comparison)

(1) Production of Positive Electrode Plate
(1a) Preparation of LCO Green Sheet

First, $Co_3O_4$ powder (manufactured by SEIDO CHEMICAL INDUSTRY CO., LTD.) and $Li_2CO_3$ powder (manufactured by THE HONJO CHEMICAL CORPORATION) weighed to a molar ratio Li/Co of 1.01 were mixed, and thereafter the mixture was kept at 780° C. for 5 hours. The resultant powder was milled and crushed into a volume-based D50 of 0.4 μm with a pot mill to obtain powder A composed of platy LCO particles. The resultant LCO powder A (100 parts by weight), a dispersive medium (toluene:isopropanol=1:1) (100 parts by weight), a binder (polyvinyl butyral: Product No. BM-2, manufactured by Sekisui Chemical Co., Ltd.) (10 parts by weight), a plasticizer (di-2-ethylhexyl phthalate (DOP), manufactured by Kurogane Kasei Co., Ltd.) (4 parts by weight), and a dispersant (product name: RHEODOL SP-O30, manufactured by Kao Corporation) (2 parts by weight) were mixed. The resultant mixture was defoamed by stirring under reduced pressure to prepare an LCO slurry with a viscosity of 4000 cP. The viscosity was measured with an LVT viscometer manufactured by Brookfield. The slurry prepared was formed into an LCO green sheet onto a PET film by a doctor blade process. The dried thickness of the LCO green sheet was 220 μm.

(1b) Preparation of LCO Sintered Plate

The LCO green sheet was separated from the PET film, and was cut into a 50 mm square. The cut piece was placed on the center of a bottom magnesia setter (dimensions: 90 mm square, height: 1 mm). A porous magnesia setter as the top setter was placed on the LCO sheet. The LCO sheet disposed between the setters was placed into an alumina sheath of a 120 mm square (manufactured by Nikkato Co., Ltd.). At this time, the alumina sheath was not tightly sealed, and was covered with a lid with a gap of 0.5 mm. The stack obtained was heated to 600° C. at a heating rate of 200° C./h and degreased for 3 hours, then heated to 820° C. at 200° C./h, and held for 20 hours for firing. After the firing, the fired laminate was cooled to room temperature, and was removed from the alumina sheath. Thus, the LCO sintered plate with a thickness of 200 μm was yielded as a positive electrode plate. The positive electrode plate obtained was cut into a circular shape with a diameter of 10 mm using a laser processing machine, to obtain a positive electrode plate.

(2) Production of Negative Electrode Plate
(2a) Preparation of LTO Green Sheet

First, LTO powder (volume-based D50 particle size 0.06 μm, manufactured by Sigma-Aldrich Japan) (100 parts by weight), a dispersion medium (toluene:isopropanol=1:1) (100 parts by weight), a binder (polyvinyl butyral: Product No. BM-2, manufactured by SEKISUI CHEMICAL CO., LTD.) (20 parts by weight), a plasticizer (DOP: Di(2-ethylhexyl)phthalate, manufactured by Kurogane Kasei Co., Ltd.) (4 parts by weight), and a dispersant (product name: RHEODOL SP-O30, manufactured by Kao Corporation) (2 parts by weight) were mixed. The resultant negative electrode raw material mixture was defoamed by stirring under reduced pressure to prepare a LTO slurry with a viscosity of 4000 cP. The viscosity was measured with an LVT viscometer manufactured by Brookfield. The slurry prepared was formed into a LTO green sheet onto a PET film by a doctor blade process. The thickness of the LTO green sheet after drying and firing was adjusted to 240 µm.

(2b) Firing of LTO Green Sheet

The green sheet obtained was cut out into a 25-mm square with a cutter knife and disposed on an embossed zirconia setter. The green sheet on the setter was put into an alumina sheath and kept at 500° C. for 5 hours. Thereafter, the temperature was raised at a heating rate of 200° C./h, to perform firing at 765° C. for 5 hours. The LTO sintered plate obtained was cut into a circular shape with a diameter of 10.5 mm using a laser processing machine, to obtain a negative electrode plate.

(3) Production of Coin-Shaped Lithium Secondary Battery

The coin-shaped lithium secondary battery 10 as schematically shown in FIG. 1 was produced as follows.

(3a) Adhesion of Negative Electrode Plate and Negative Electrode Current Collector with Conductive Carbon Paste Acetylene black and polyimide amide were weighed to a mass ratio of 3:1 and mixed with an appropriate amount of NMP (N-methyl-2-pyrrolidone) as a solvent, to prepare a conductive carbon paste. The conductive carbon paste was screen-printed on an aluminum foil as a negative electrode current collector. The negative electrode plate produced in (2) above was disposed within an undried printing pattern (that is, a region coated with the conductive carbon paste), followed by vacuum drying at 60° C. for 30 minutes, to produce a negative electrode structure with the negative electrode plate and the negative electrode current collector bonded via a carbon layer. The carbon layer had a thickness of 10 µm.

(3b) Preparation of Positive Electrode Current Collector with Carbon Layer

Acetylene black and polyimide amide were weighed to a mass ratio of 3:1 and mixed with an appropriate amount of NMP (N-methyl-2-pyrrolidone) as a solvent, to prepare a conductive carbon paste. The conductive carbon paste was screen-printed on an aluminum foil as a positive electrode current collector, followed by vacuum drying at 60° C. for 30 minutes, to produce a positive electrode current collector with a carbon layer formed on a surface. The carbon layer had a thickness of 5 µm.

(3c) Assembling of Coin-Shaped Battery

The positive electrode current collector, the carbon layer, the LCO positive electrode plate, a cellulose separator, the LTO negative electrode plate, the carbon layer, and the negative electrode current collector were accommodated between the positive electrode can and the negative electrode can, which would form a battery case, so as to be stacked in this order from the positive electrode can toward the negative electrode can, and an electrolytic solution was filled therein. Thereafter, the positive electrode can and the negative electrode can were crimped via a gasket to be sealed. Thus, the coin cell-shaped lithium secondary battery 10 with a diameter of 12 mm and a thickness of 1.0 mm was produced. At this time, the electrolytic solution was a solution of $LiBF_4$ (1.5 mol/L) in a mixed organic solvent of ethylene carbonate (EC) and γ-butyrolactone (GBL) at 1:3 (volume ratio).

(4) Evaluation

The LCO sintered plate (positive electrode plate) synthesized in Procedure (1b) above, the LTO sintered plate (negative electrode plate) synthesized in Procedure (2b) above, and the coin-shaped lithium secondary battery manufactured in Procedure (3) above were evaluated for the average orientation angle of the primary grains, the layer thickness, the porosity, the mean pore diameter, the area displacement ratio between the positive and negative electrodes, the discharge capacity/theoretical capacity ratio, and the pulse cycle capacity retention rate, as in Example B1.

Evaluation Results

Tables 2 and 3 show the evaluation results for Examples B1 to B6.

TABLE 2

| | Configuration of positive electrode/ separator/ negative electrode | Positive electrode layer | | | | | Negative electrode layer | | | | Separator | |
|---|---|---|---|---|---|---|---|---|---|---|---|---|
| | | Type | Average orientation angle | Thickness (µm) | Porosity (%) | Mean pore diameter (µm) | Type | Thickness (µm) | Porosity (%) | Mean pore diameter (µm) | Type | Thickness (µm) |
| Example B1* | Integrated sintered plate | LCO SINTERED BODY | 16° | 60 | 45 | 0.8 | LTO SINTERED BODY | 70 | 50 | 0.2 | MgO | 25 |
| Example B2* | Integrated sintered plate | LCO SINTERED BODY | 16° | 100 | 45 | 0.8 | LTO SINTERED BODY | 120 | 50 | 0.2 | MgO | 25 |
| Example B3* | Integrated sintered plate | LCO SINTERED BODY | 16° | 200 | 45 | 0.8 | LTO SINTERED BODY | 240 | 50 | 0.2 | MgO | 25 |
| Example B4* | Integrated sintered plate | LCO SINTERED BODY | 16° | 400 | 45 | 0.8 | LTO SINTERED BODY | 480 | 50 | 0.2 | MgO | 25 |
| Example B5* | Integrated sintered plate | LCO SINTERED BODY | 16° | 400 | 45 | 0.25 | LTO SINTERED BODY | 480 | 50 | 0.2 | MgO | 25 |

TABLE 2-continued

| Configuration of positive electrode/ separator/ negative electrode | Positive electrode layer | | | | | Negative electrode layer | | | | Separator | |
|---|---|---|---|---|---|---|---|---|---|---|---|
| | Type | Average orientation angle | Thickness (μm) | Porosity (%) | Mean pore diameter (μm) | Type | Thickness (μm) | Porosity (%) | Mean pore diameter (μm) | Type | Thickness (μm) |
| Example B6* | Assembly type | LCO SINTERED BODY | Random | 200 | 38 | 0.8 | LTO SINTERED BODY | 240 | 38 | 0.2 | Cellulose | 25 |

Symbol ★ represents a reference example, and symbol * represents a comparative example.
※ LCO represents $LiCoO_2$, and LTO represents $Li_4Ti_5O_{12}$.

TABLE 3

| | Properties | | |
|---|---|---|---|
| | Area displacement ratio between positive and negative electrodes (%) | Discharge capacity/ theoretical capacity ratio (%) | Pulse cycle capacity retention rate (%) |
| Example B1 ★ | 0 | 100 | 99 |
| Example B2 ★ | 0 | 100 | 99 |
| Example B3 ★ | 0 | 100 | 98 |
| Example B4 ★ | 0 | 100 | 96 |
| Example B5 ★ | 0 | 100 | 96 |
| Example B6 * | 5 | 97 | 94 |

Symbol ★ represents a reference example, and symbol * represents a comparative example.

What is claimed is:

1. A lithium secondary battery comprising:
a positive electrode layer composed of a cobalt-containing lithium composite oxide sintered body;
a negative electrode layer composed of a titanium-containing sintered body;
a ceramic separator interposed between the positive electrode layer and the negative electrode layer;
an electrolytic solution impregnating at least the ceramic separator; and
an exterior body having a closed space and accommodating the positive electrode layer, the negative electrode layer, the ceramic separator, and the electrolytic solution within the closed space,
wherein the positive electrode layer, the ceramic separator, and the negative electrode layer form one integrated sintered plate as a whole, whereby the positive electrode layer, the ceramic separator, and the negative electrode layer are bonded together, and
wherein the lithium composite oxide sintered body comprises 0.05 to 2.0 mol % of boron with respect to the content of cobalt in the lithium composite oxide sintered body or 0.05 to 1.2 mol % of strontium with respect to the content of cobalt in the lithium composite oxide sintered body, as an auxiliary agent.

2. The lithium secondary battery according to claim 1, wherein the lithium composite oxide sintered body comprises 0.2 to 1.8 mol % of boron with respect to the content of cobalt in the lithium composite oxide sintered body.

3. The lithium secondary battery according to claim 1, wherein the lithium composite oxide sintered body comprises 0.2 to 1.0 mol % of strontium with respect to the content of cobalt in the lithium composite oxide sintered body.

4. The lithium secondary battery according to claim 1, wherein the lithium composite oxide is lithium cobaltate.

5. The lithium secondary battery according to claim 1, wherein the positive electrode layer has a thickness of 60 to 600 μm.

6. The lithium secondary battery according to claim 1, wherein the positive electrode layer has a porosity of 20 to 60%.

7. The lithium secondary battery according to claim 1, wherein the positive electrode layer has a mean pore diameter of 0.1 to 10.0 μm.

8. The lithium secondary battery according to claim 1, wherein the positive electrode layer is an oriented positive electrode layer comprising a plurality of primary grains composed of a lithium composite oxide, the plurality of primary grains being oriented at an average orientation angle of over 0° and 30° or less to a layer face of the positive electrode layer.

9. The lithium secondary battery according to claim 1, wherein the negative electrode layer has a thickness of 70 to 800 μm.

10. The lithium secondary battery according to claim 1, wherein the titanium-containing sintered body comprises lithium titanate or niobium titanium composite oxide.

11. The lithium secondary battery according to claim 1, wherein the negative electrode layer has a porosity of 20 to 60%.

12. The lithium secondary battery according to claim 1, wherein the negative electrode layer has a mean pore diameter of 0.08 to 5.0 μm.

13. The lithium secondary battery according to claim 1, wherein the ceramic separator has a thickness of 3 to 50 μm.

14. The lithium secondary battery according to claim 1, wherein the ceramic separator comprises at least one selected from the group consisting of MgO, $Al_2O_3$, $ZrO_2$, SiC, $Si_3N_4$, AlN, and cordierite.

15. The lithium secondary battery according to claim 1, further comprising a positive electrode current collector and a negative electrode current collector.

* * * * *